US007329702B2

(12) United States Patent
Nelson et al.

(10) Patent No.: US 7,329,702 B2
(45) Date of Patent: Feb. 12, 2008

(54) COMPOSITION AND METHOD OF MAKING THE SAME

(75) Inventors: James M. Nelson, Roseville, MN (US); Ryan E. Marx, Cottage Grove, MN (US); John W. Longabach, Woodbury, MN (US); Kenneth J. Hanley, Eagan, MN (US); Terri A. Shefelbine, St. Paul, MN (US); Myles L. Brostrom, West Lakeland Township, MN (US); Jeffrey J. Cernohous, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 519 days.

(21) Appl. No.: 10/950,934

(22) Filed: Sep. 27, 2004

(65) Prior Publication Data

US 2006/0074169 A1    Apr. 6, 2006

(51) Int. Cl.
C08K 3/34    (2006.01)
(52) U.S. Cl. ............. 524/445; 524/186; 501/145
(58) Field of Classification Search ............ 524/445, 524/186; 501/145
See application file for complete search history.

(56) References Cited

U.S. PATENT DOCUMENTS

| 3,252,757 | A | 5/1966 | Granquist |
| 3,666,407 | A | 5/1972 | Orlemann |
| 3,671,190 | A | 6/1972 | Neumann |
| 3,844,978 | A | 10/1974 | Hickson |
| 3,844,979 | A | 10/1974 | Hickson |
| 3,852,405 | A | 12/1974 | Granquist |
| 3,855,147 | A | 12/1974 | Granquist |
| 4,469,639 | A | 9/1984 | Thompson, III et al. |
| 5,206,284 | A | 4/1993 | Fukui et al. |
| 5,244,970 | A | 9/1993 | Kobayashi et al. |
| 5,514,734 | A | 5/1996 | Maxfield et al. |
| 5,840,796 | A | 11/1998 | Badesha et al. |
| 5,939,184 | A | 8/1999 | Inoue et al. |
| 6,036,765 | A | 3/2000 | Farrow et al. |
| 6,060,549 | A | 5/2000 | Li et al. |
| 6,339,121 | B1 | 1/2002 | Rafailovich et al. |
| 6,379,791 | B1 | 4/2002 | Cernohous et al. |
| 6,391,326 | B1 | 5/2002 | Crepeau et al. |
| 6,395,386 | B2 | 5/2002 | Bagrodia et al. |
| 6,407,155 | B1 | 6/2002 | Qian et al. |
| 6,407,169 | B1 | 6/2002 | Gauthier et al. |
| 6,448,353 | B1 | 9/2002 | Nelson et al. |
| 6,521,678 | B1 | 2/2003 | Chaiko |
| 6,541,557 | B1 | 4/2003 | Hasegawa et al. |
| 6,579,927 | B1 * | 6/2003 | Fischer .............. 524/445 |
| 6,589,299 | B2 | 7/2003 | Missling et al. |
| 6,630,239 | B2 | 10/2003 | Cernohous et al. |
| 6,716,935 | B1 | 4/2004 | Nelson et al. |
| 6,730,719 | B2 | 5/2004 | Powell |
| 6,767,951 | B2 | 7/2004 | Nair et al. |
| 6,767,952 | B2 * | 7/2004 | Dontula et al. ............. 524/445 |
| 6,777,479 | B1 | 8/2004 | Bernard et al. |
| 2003/0022963 | A1 | 1/2003 | Parsons |
| 2003/0035756 | A1 | 2/2003 | Nelson et al. |
| 2003/0093107 | A1 | 5/2003 | Parsonage et al. |
| 2003/0100652 | A1 | 5/2003 | Kim et al. |
| 2004/0023016 | A1 | 2/2004 | Cernohous et al. |
| 2004/0023398 | A1 | 2/2004 | Nelson et al. |
| 2004/0024130 | A1 | 2/2004 | Nelson et al. |
| 2004/0059024 | A1 | 3/2004 | Reinking et al. |
| 2004/0254268 | A1 | 12/2004 | Cernohous et al. |
| 2004/0265188 | A1 | 12/2004 | Marx et al. |
| 2005/0256242 | A1 | 11/2005 | Ottaviani et al. |

FOREIGN PATENT DOCUMENTS

| EP | 0 427 344 A2 | 8/1991 |
| EP | 1 217 030 A2 | 6/2002 |
| EP | 1 384 750 A1 | 1/2004 |
| EP | 1 598 396 A1 | 11/2005 |
| JP | 2000-204214 | 7/2000 |
| JP | 2004-99830 | 4/2004 |
| KR | 2002-0015406 | 2/2002 |
| KR | 2003-0017216 | 3/2002 |
| KR | 2002-0050493 | 6/2002 |
| WO | WO 88/02048 | 3/1988 |
| WO | WO 99/41060 | 8/1999 |
| WO | WO 99/41299 | 8/1999 |
| WO | WO 00/53672 | 9/2000 |
| WO | WO 00/78540 A1 | 12/2000 |
| WO | WO 01/34685 A1 | 5/2001 |

(Continued)

OTHER PUBLICATIONS

Wang et al., "Poly(vinylidene fluoride-hexafluoropropylene)/organo-montmorillonite clays nanocomposite lithium polymer electrolytes", Electrochimica Acta, vol. 49, 2004, pp. 3595-3602.
Wu et al., "Structural, Thermao, and Electrical Characterization of Layered Nanocomposites, Derived from Na-Montmorillonite and Polyethers", Chem. Mater., vol. 5, 1993, pp. 835-838.
Declaration of Jeffrey J. Cernohous, dated Mar. 11, 2005.
Advincula et al., "Surface Initiated Polymerization (SIP) on Nanoparticle Surfaces: Demonstration of First Principles and Preparation of Nanocomposite Materials", Mat. Res. Soc. Symp. Proc. (2001), vol. 676, pp. Y3.44.1-Y3.44.6.
Chen et al., "Synthesis of Epoxy and Block Oligomer Modified Clay Nanocomposite", Mat. Res. Soc. Symp. Proc. (2002), vol. 703, pp. 547-550.
Lim et al, "Microstructure and Rheological Behavior of Block Copolymer/Clay Nanocomposites", Koren J. Chem. Eng. (2001), vol. 18(1), pp. 21-25.

(Continued)

Primary Examiner—Katarzyna Wyrozebski
(74) Attorney, Agent, or Firm—Dena M. Ehrich; C. Michael Geise

(57) ABSTRACT

A composition comprising a fluorinated block copolymer and at least one of an intercalated layered silicate or exfoliated silicate platelets, and methods of making the same.

26 Claims, No Drawings

FOREIGN PATENT DOCUMENTS

| | | |
|---|---|---|
| WO | WO 03/059817 A2 | 7/2003 |
| WO | WO 2004/074371 A1 | 9/2004 |
| WO | WO 2005/061623 A2 | 7/2005 |

OTHER PUBLICATIONS

Lee et al., "Linear Dynamic Viscoelastic Properties of Functionalized Block Copolymer/Organoclay Nanocomposites", Macromolecules (2003), vol. 36, No. 3, pp. 804-815.

Hou et al., "Clay Intercalation of Poly(styrene-ethylene oxide) Block Copolymers Studied by Two-Dimensional Solid-State NMR", Macromolecules (2003), vol. 36, No. 8, pp. 2769-2776.

Limary et al., "Stability of Diblock Copolymer/Layered Silicate Nanocomposite Thin Films", Macromolecules (2000), vol. 33, No. 14, pp. 5227-5234.

Mitchell et al., "Rheological Properties of Diblock Copolymer/ Layered Silicate Nanocomposites", Journal of Polymer Science: Part B: Polymer Physics (2002), vol. 40, pp. 1434-1443.

Dortmans et al., "Reinforcement of a Porous PMMA Filter Material by Nanodispersed Clay", Advanced Engineering Materials (2001), vol. 3, No. 9, pp. 717-720.

Moreno et al., "Dielectric relaxation of poly(ethylenglycol)-b-poly(propylenglycol)-b-poly-ethylenglycol) copolymers above the glass transition temperature", Eur. Phys. J. E. (2001), vol. 4, pp. 173-182.

Groenewold et al., "Elastic interactions and stability of clay-filled lamellar phases", Eur. Phys. J. E. (2001), vol. 5, pp. 171-182.

Silva et al., "Templating of cylindrical and spherical block copolymer microdomains by layered silicates", Journal of Chemical Physics (Oct. 15, 2001), vol. 115, No. 15, pp. 7166-7174.

Zhang et al., "A novel property of styrene-butadiene-styrene/clay nanocomposites: radiation resistance", Journal of Materials Chemistry, vol. 14, pp. 209-213 (Published on web Dec. 2, 2003).

Lee et al., "Alignment and orientational proliferation of HEX cylinders in a polystyrene-block-polyisoprene-block-polystyrene copolymer in the presence of clays", Polymer (Mar. 2003), vol. 44, No. 5, pp. 1705-1710.

Chen et al., "Poly(styrene-block-isoprene) Nanocomposites: Kinetics of Intercalation and Effects of Copolymer on Intercalation Behaviors", Journal of Polymer Science: Part B: Polymer Physics (Dec. 15, 2003), vol. 41 No. 24, pp. 3264-3271.

Zhao et al., "Preparation of Poly(styrene-block-butyl acrylate) Block Copolymer-Silicate Nanocomposites", Chem. Mater. (Jul. 15, 2003), vol. 15, No. 14, pp. 2693-2695.

Wang et al., "Melt-Processable Syndioactic Polystyrene/ Montmorillonite Nanocomposites", Journal of Polymer Science: Part B: Polymer Physics (Dec. 15, 2003), vol. 41, No. 24, pp. 3173-3187.

ASTM D-1708-02a "Standard Test Method for Tensile Properties of Plastics By Use of Microtensile Specimens", Annual Book of ASTM Standards (2004), Section 8, vol. 08.01, pp. 394-398.

Runt et al., "Modified Biomedical Poly(Urethane) Block Copolymers: Nanocomposites and Polyisobutylene Comb Polymers", Polymer Preprints (2001), vol. 42, No. 2, pp. 99-100.

Jin et al., "Crystallization Behavior of Polyethylene Glycol Terephthalate/Polyethylene Glycol Intercalated Block Copolymers", Chemical Journal of Chinese Universities (May 2000), vol. 21, No. 5, pp. 801-804 (English Translation Included).

Antipov et al., "Composition and Deformation Behaviour of Nanocomposits on the Base of Low Density Polyethylene and Modified Clays", High-molecular compositions, Series A (2003), vol. 45, No. 11, pp. 1874-1884 (English Translation Included).

Finnefrock et al., "The Plumber's Nightmare: A New Morphology in Block Copolymer—Ceramic Nanocomposites and Mesoporous Aluminosilicates", J. Am. Chem. Soc., (Oct. 29, 2003), vol. 125, No. 43, pp. 13084-13093.

Garcia-Leiner et al., "Melt intercalation in Polymer-Clay nanocomposites promoted by supercritical Carbon Dioxide", Polymeric Materials, Science & Engineering (Sep. 7-11, 2003), vol. 89, pp. 649-650.

Nelson et al., "Method of Making a Composition and Nanocomposites Therefrom", U.S. Appl. No. 10/950,834, filed Sep. 27, 2004.

Nelson et al., "Nanocomposite and Method of Making the Same", U.S. Appl. No.10/950,932, filed Sep. 27, 2004.

* cited by examiner

COMPOSITION AND METHOD OF MAKING THE SAME

BACKGROUND

Many materials have been added to polymeric resins to reinforce them. Such reinforced polymeric resins are generally referred to as composite materials or "composites". One popular type of such a reinforcing material is fiber. Flake and particulate materials have also been used to reinforce polymer matrices. In particular, a type of composite has emerged in recent years in which the reinforcing material has one or more dimensions on the order of a nanometer. Such a composite is known in the art as a "nanocomposite". One type of nanocomposite has an exfoliated layered silicate as the reinforcing material wherein the layered structure is broken down and individual silicate platelets are dispersed throughout the polymeric resin.

Layered silicates are typically composed of stacked silicate platelets. The silicate platelets typically have a thickness on the order of about one nanometer and typically have an aspect ratio of at least about 100. The spaces between these platelets are called gallery spaces. Under the proper conditions, the gallery spaces can be filled with monomer, oligomer, or polymer. This increases the distance between silicate platelets, swelling the layered silicate in a method termed intercalation. If the layered silicate swells so much that at least some of the individual silicate platelets are no longer organized into stacks, those individual silicate platelets are said to be "exfoliated".

SUMMARY

In one aspect, the present invention provides a method of making a composition, the method comprising:
  combining components comprising:
    a first layered silicate having a first d-layer spacing, and
    a block copolymer having:
      at least one block that is compatible with the first layered silicate, and
      at least one highly fluorinated block;
  applying at least sufficient thermal energy and at a sufficient shear rate to provide a mixture comprising the block copolymer having dispersed therein at least one of:
    a) a second layered silicate having a second d-layer spacing that is greater than the first d-layer spacing; or
    b) exfoliated silicate platelets.

In one embodiment, the method further comprises combining the mixture with a polymeric resin to provide a nanocomposite, wherein the nanocomposite comprises exfoliated silicate platelets dispersed in the polymeric resin.

Methods according to the present invention expand the range of processes and materials that may be used to intercalate and exfoliate layered silicates. The methods are useful for preparing nanocomposites, for example, nanocomposites comprising a fluoropolymer resin.

Accordingly, in another aspect, the present invention provides a composition comprising a block copolymer and at least one of an intercalated layered silicate or exfoliated silicate platelets, wherein the intercalated layered silicate comprises the block copolymer intercalated into the layered silicate, wherein at least one block of the block copolymer is compatible with the first layered silicate, and wherein the block copolymer comprises at least one highly fluorinated block.

In one embodiment, the composition further comprises at least one polymeric resin.

Unless otherwise indicated, d-layer spacing values refer to d-layer spacing values determined at 25° C.

As used herein,
  the term "block" refers to a portion of a block copolymer, comprising many monomeric units, that has at least one feature which is not present in the adjacent portions;
  the term "block copolymer" refers to a copolymer composed of constitutionally different blocks in linear sequence;
  the term "monomeric unit" refers to the largest constitutional unit contributed by a single monomer molecule to the structure of a polymer;
  the phrase "compatible with the layered silicate" means capable of intercalating the layered silicate; and
  the term "exfoliated silicate platelet" refers to an individual silicate platelet that is less than about 5 nanometers thick and has an aspect ratio of at least about 10, and is not associated as a face-to-face stack with at least one other such silicate platelet, regardless of whether the silicate platelet was made by exfoliating a layered silicate or by some other method;

DETAILED DESCRIPTION

Useful layered silicates that may be used as the first layered silicate according to the present invention include, for example, natural phyllosilicates, synthetic phyllosilicates, organically modified phyllosilicates (e.g., organoclays), and combinations thereof.

Examples of natural phyllosilicates include smectite and smectite-type clays such as montmorillonite, nontronite, bentonite, beidellite, hectorite, saponite, sauconite, fluorohectorite, stevensite, volkonskoite, magadiite, kenyaite, halloysite, and hydrotalcite.

Suitable phyllosilicates include, for example, those prepared by hydrothermal processes as disclosed in U.S. Pat. No. 3,252,757 (Granquist); U.S. Pat. No. 3,666,407 (Orlemann); U.S. Pat. No. 3,671,190 (Neumann); U.S. Pat. No. 3,844,978 (Hickson); U.S. Pat. No. 3,844,979 (Hickson); U.S. Pat. No. 3,852,405 (Granquist); and U.S. Pat. No. 3,855,147 (Granquist). Commercially available synthetic smectite clays are commercially available, for example, from Southern Clay Products, Inc., Gonzales, Tex., under the trade designation "LAPONITE" including, for example, "LAPONITE B" (a synthetic layered fluorosilicate), "LAPONITE D" (a synthetic layered magnesium silicate), and "LAPONITE RD" (a synthetic layered silicate).

Organoclays are typically smectite or smectite-type clays produced by interacting the unfunctionalized clay with one or more suitable intercalants. These intercalants are typically organic compounds, which are neutral or ionic. Useful neutral organic intercalants include polar compounds such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic intercalants may intercalate into the layers of the clay through hydrogen bonding without completely replacing the original charge balancing ions. Useful ionic intercalants are typically cationic surfactants such as, for example, onium compounds such as ammonium (primary, secondary, tertiary, and quaternary), phosphonium, or sulfonium derivatives of aliphatic, aromatic or aliphatic amines, phosphines and sulfides. Useful onium ions include, for example, quaternary ammonium ions having at least one long chain aliphatic group (e.g., octadecyl, myristyl, or oleyl) bound to the quaternary nitrogen atom. Further details concerning organoclays and methods for their preparation may be found, for example, in U.S. Pat. No. 4,469,639 (Thompson et al.); U.S. Pat. No. 6,036,765 (Farrow et al.); and U.S. Pat. No. 6,521,678B1 (Chaiko).

A variety of organoclays are available from commercial sources. For example, Southern Clay Products offers various organoclays under the trade designations "CLOISITE" (derived from layered magnesium aluminum silicate) and "CLAYTONE" (derived from natural sodium bentonite) including "CLAYTONE HY", "CLAYTONE AF", "CLOISITE 6A" (modifier concentration of 140 meq/100 g), "CLOISITE 15A" (modifier concentration of 125 meq/100 g), and "CLOISITE 20A" (modifier concentration of 95 meq/100 g). Organoclays are also available commercially from Nanocor, Arlington Heights, Ill., under the trade designation "NANOMER".

Typically, layered silicates exhibit a d-layer spacing that can be determined by well-known techniques such as X-ray diffraction (XRD) and/or transmission electron microscopy (TEM). During the method of the present invention the d-layer spacing typically increases as intercalation between individual silicate layers by the block copolymer proceeds until the layers become so widely separated that they are considered exfoliated and no d-layer spacing is observable by XRD or TEM.

Block copolymers are generally formed by sequentially polymerizing different monomers. Useful methods for forming block copolymers include, for example, anionic, coordination, cationic, and free radical polymerization methods.

Useful block copolymers may have any number of blocks greater than or equal to two (e.g., di-, tri-, tetra-block copolymers), and may have any form such as, for example, linear, star, comb, or ladder. Generally, at least one block should have an affinity for the chosen layered silicate (including organoclay). This block may be hydrophilic or hydrophobic (e.g., when using organoclays) in nature. Typically, the block copolymer is thermoplastic, although the polymer may not be thermoplastic as long as it is capable of intercalating the layered silicate. For example, the block copolymer may be liquid.

Hydrophilic blocks typically have one or more polar moieties such as, for example, acids (e.g., —$CO_2H$, —$SO_3H$, —$PO_3H$); —OH; —SH; primary, secondary, or tertiary amines; ammonium N-substituted or unsubstituted amides and lactams; N-substituted or unsubstituted thioamides and thiolactams; anhydrides; linear or cyclic ethers and polyethers; isocyanates; cyanates; nitriles; carbamates; ureas; thioureas; heterocyclic amines (e.g., pyridine or imidazole)). Useful monomers that may be used to introduce such groups include, for example, acids (e.g., acrylic acid, methacrylic acid, itaconic acid, maleic acid, fumaric acid, and including methacrylic acid functionality formed via the acid catalyzed deprotection of t-butyl methacrylate monomeric units as described in U.S. Pat. Appl. Publ. No. "2004/0024130" (Nelson et al.)); acrylates and methacrylates (e.g., 2-hydroxyethyl acrylate), acrylamide and methacrylamide, N-substituted and N,N-disubstituted acrylamides (e.g., N-t-butylacrylamide, N,N-(dimethylamino) ethylacrylamide, N,N-dimethylacrylamide, N,N-dimethylmethacrylamide), N-ethylacrylamide, N-hydroxyethylacrylamide, N-octylacrylamide, N-t-butylacrylamide, N,N-dimethylacrylamide, N,N-diethylacrylamide, and N-ethyl-N-dihydroxyethylacrylamide), aliphatic amines (e.g., 3-dimethylaminopropyl amine, N,N-dimethylethylenediamine); and heterocyclic monomers (e.g., 2-vinylpyridine, 4-vinylpyridine, 2-(2-aminoethyl)pyridine, 1-(2-aminoethyl)pyrrolidine, 3-aminoquinuclidine, N-vinylpyrrolidone, and N-vinylcaprolactam).

Hydrophobic blocks typically have one or more hydrophobic moieties such as, for example, aliphatic and aromatic hydrocarbon moieties such as those having at least about 4, 8, 12, or even 18 carbon atoms; fluorinated aliphatic and/or fluorinated aromatic hydrocarbon moieties, such as for example, those having at least about 4, 8, 12, or even 18 carbon atoms; and silicone moieties.

At least one block of the block copolymer is highly fluorinated. In some embodiments the highly fluorinated block is perfluorinated. Useful monomers for introducing such blocks include, for example, fluorinated monomers such as: fluorinated olefins such as, for example, vinyl fluoride, tetrafluoroethylene, hexafluoropropylene, pentafluoropropene, trifluoroethylene, difluoroethylene, and chlorotrifluoroethylene, dichlorodifluoroethylene, hexafluorobutadiene, partially or completely fluorinated butadienes, 1-chloro-1,2-difluoroethylene, 1,2-dichloro-1,2-difluoroethylene, 1,1-chlorofluoroethylene, trifluoroethylene, 2-chloroperfluoropropene, perfluoroalkyl vinyl ethers, perfluoroalkoxy vinyl ethers (e.g., $CF_3OCF=CF_2$), fluorinated acrylates, and combinations thereof.

One exemplary such fluorinated acrylate is a perfluoroalkylsulfonamidoalkylene acrylate or methacrylate having the formula $H_2C=C(R_2)C(O)O-X-N(R)SO_2R_f'$ wherein: $R_f'$ is —$C_6F_{13}$, —$C_4F_9$, or —$C_3F_7$; R is hydrogen, $C_1$ to $C_{10}$ alkyl, or $C_6$-$C_{10}$ aryl; and X is a divalent connecting group. Examples include $C_4F_9SO_2N(CH_3)C_2H_4OC(O)NH(C_6H_4)CH_2C_6H_4NHC(O)OC_2H_4OC(O)CH=CH_2$ or

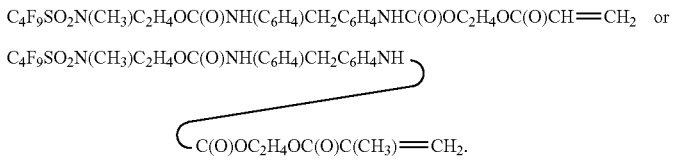

Such monomers may be readily obtained from commercial sources or prepared, for example, according to the procedures in U.S. Pat. Appl. Publ. No. 2004/0023016 (Cernohous et al.), the disclosure of which is incorporated herein by reference.

The foregoing fluorinated monomers may be copolymerized with one or more non-fluorinated monomers. Examples of such non-fluorinated monomers include, for example, hydrocarbon olefins such as, for example, ethylene, propylene, 1-butene, isobutylene, isoprene, styrene, and butadiene; chlorinated olefins such as, for example, 2-chlorobutadiene and vinyl chloride; vinyl ethers and vinyl esters such as, for example, methyl vinyl ether and vinyl acetate; nonfluorinated alkyl acrylates and methacrylates such as for example, butyl acrylate, isooctyl methacrylate lauryl acrylate, and stearyl acrylate.

Examples of block copolymers having a hydrophilic block and a fluorinated block include poly(MeFBSEMA-block-methacrylic acid) (wherein "MeFBSEMA" refers to 2-(N-methylperfluorobutanesulfonamido)ethyl methacrylate, e.g., as available from 3M Company, Saint Paul, Minn.), poly(MeFBSEMA-block-t-butyl methacrylate), poly(styrene-block-t-butyl methacrylate-block-MeFBSEMA), poly(styrene-block-methacrylic anhydride-block-MeFBSEMA), poly(styrene-block-methacrylic acid-block-MeFBSEMA), poly(styrene-block-(methacrylic anhydride-co-methacrylic acid)-block-MeFBSEMA)), poly(styrene-block-(methacrylic anhydride-co-methacrylic acid-co-MeFBSEMA)), poly(styrene-block-(t-butyl methacrylate-co-MeFBSEMA)), poly(styrene-block-isoprene-block-t-butyl methacrylate-block-MeFBSEMA), poly(styrene-isoprene-block-methacrylic anhydride-block-MeFBSEMA), poly(styrene-isoprene-block-mathacrylic acid-block-MeFBSEMA), poly(styrene-block-isoprene-block-(methacrylic anhydride-co-methacrylic acid)-block-MeFBSEMA), poly(styrene-block-isoprene-block-(methacrylic anhydride-co-methacrylic acid-co-MeFBSEMA)), poly(styrene-block-isoprene-block-(t-butyl methacrylate-co-MeFBSEMA)), poly(MeFBSEMA-block-methacrylic anhydride), poly(MeFBSEMA-block-(methacrylic acid-co-methacrylic anhydride)), poly(styrene-block-(t-butyl methacrylate-co-MeFBSEMA)), poly(styrene-block-butadiene-block-t-butyl methacrylate-block-MeFBSEMA), poly(styrene-butadiene-block-methacrylic anhydride-block-MeFBSEMA), poly(styrene-butadiene-block-methacrylic acid-block-MeFBSEMA), poly(styrene-block- butadiene-block-(methacrylic anhydride-co-methacrylic acid)-block-MeFBSEMA), poly(styrene-block-butadiene-block-(methacrylic anhydride-co-methacrylic acid-co-MeFBSEMA)), poly(styrene-block-butadiene-block-(t-butyl methacrylate-co-MeFBSEMA)), poly(MeFBSEMA-block-methacrylic anhydride), and poly(MeFBSEMA-block-(methacrylic acid-co-methacrylic anhydride)).

Any amount of block copolymer may be used, however, typically the block copolymer is included in an amount in a range of 0.01 to 10 parts or more by weight for every part of the layered silicate included in the first mixture. More typically, the block copolymer is included in an amount in a range of 0.05 to 2 parts or more by weight for every part of the layered silicate included in the first mixture.

The block copolymer and layered silicate may be combined by any suitable technique including, for example, by blending as a melt in a mechanical kneader or extruder.

A solvent may, optionally, be combined with the block copolymer and layered silicate, for example, to aid in intercalation and/or exfoliation of the layered silicate. Useful solvents include, for example, organic solvents, water, supercritical $CO_2$, and combinations thereof. Examples of organic solvents include esters (e.g., ethyl acetate, butyl acetate, beta-ethoxyethyl acetate, beta-butoxy-beta-ethoxyethyl acetate, methylcellosolve acetate, cellosolve acetate, diethylene glycol monoacetate, methoxytriglycol acetate, and sorbitol acetate), ketones (e.g., methyl isobutyl ketone, 2-butanone, acetonylacetone, and acetone), aromatic hydrocarbons (e.g., benzene, toluene, and xylene), aliphatic hydrocarbons (e.g., cyclohexane, heptane, octane, decane, and dodecane), nitriles (e.g., acetonitrile), ethers (e.g., tetrahydrofuran, dioxane, and diglyme), alcohols (e.g., methanol, ethanol, isopropanol, butanol, octanol, decanol, butylcarbitol, methylcarbitol, diethylene glycol, dipropylene glycol, ethylene glycol, propylene glycol, ethylene glycol monomethyl ether, ethylene glycol monobutyl ether, and diacetone alcohol), halocarbons (e.g., carbon tetrachloride, methylene chloride, trifluorotoluene, and chloroform), and combinations thereof.

However, if a solvent is used its content in the mixture comprising block copolymer and intercalated layered silicate and/or exfoliated silicate platelets is typically reduced to a low level, although this is not a requirement. For example, mixtures and/or nanocomposites according to the present invention may be essentially free of (i.e., contain less than about one percent of) solvent. Methods for removing solvent include, for example, oven drying and evaporation under reduced pressure.

One exemplary method for removing solvent is described in concurrently filed U.S. patent application Ser. No. 10/950,834, entitled "METHOD OF MAKING A COMPOSITION AND NANOCOMPOSITES THEREFROM" (Nelson et al.), the disclosure of which is incorporated herein by reference. According to that method, the extent of intercalation and /or exfoliation of the layered silicate can be controlled in large part through variables including, for example, concentration or composition of components, pressure (i.e., vacuum) in the mixing apparatus, the temperature profile of the process (e.g., isothermal or ramped), screw design, order of addition of materials, the level of applied shear force and/or rate, and the duration of the mixing process. For example, intercalation and/or exfoliation may typically be enhanced by increasing the temperature or reducing the rate of solvent removal (e.g., by lessening the degree of an applied vacuum). In selecting the temperature the physical properties and chemical properties of the solvent, clay, and block copolymer should be considered, for example, such that decomposition of the clay and/or block copolymer may be kept at a relatively low level. Such variables may be modified in a continuous or stepwise manner, or they may be maintained at a constant level. To aid in processing, the temperature of kneader or extruder is typically kept above the glass transition temperature and/or melting temperature of the block copolymer, although this is not a requirement.

In some embodiments, the mixture comprising block copolymer and intercalated layered silicate and/or exfoliated silicate platelets may comprise a masterbatch that has a relatively high content of intercalated and/or exfoliated layered silicates, and which may be subsequently let down into (i.e., added to) a polymeric resin. For example, the total amount of the second layered silicate and exfoliated silicate platelets may comprise at least 30, 40, 50, 60 percent by weight or more of the mixture comprising block copolymer and intercalated layered silicate and/or exfoliated silicate platelets.

In some embodiments, the mixture comprising the block copolymer and intercalated layered silicate and/or exfoliated silicate platelets may be mixed with (i.e., let down in) a polymeric resin or mixture of polymeric resins. In one embodiment, the second mixture may comprise a masterbatch that typically has a relatively high content of intercalated layered silicates and/or exfoliated silicate platelets. For example, the total amount of the second layered silicate and exfoliated silicate platelets in the masterbatch may comprise at least 30, 40, 50, 60 percent by weight or more of the second mixture.

Mixing of mixture comprising the block copolymer and intercalated layered silicate and/or exfoliated silicate platelets with the polymeric resin may be accomplished by any suitable technique, typically depending on the nature of the polymeric resin. Such techniques include for example, extruding, stirring, and kneading, optionally in the presence of a solvent.

In one useful embodiment, the mixture comprising the block copolymer and intercalated layered silicate and/or exfoliated silicate platelets is combined with a fluid polymeric resin within the body of a screw extruder, whereupon it forms a fluid (e.g., molten) nanocomposite material that may be solidified (e.g., by cooling or curing) after extraction from the extruder, although other methods of combining the polymeric resin and second mixture may also be used.

While the block copolymer, layered silicate, and polymeric resin may be combined in sequential steps such as for example, those described above, in some embodiments, the polymeric resin, layered silicate, and block copolymer may be combined and the layered silicate exfoliated in a single step. Such single step processes may be carried out using methods suitable for mixing the block copolymer with the layered silicate, for example, as described herein.

Any amount of the mixture comprising the block copolymer and intercalated layered silicate and/or exfoliated silicate platelets may be let down into any amount of polymeric resin, for example, depending on the intended physical properties of the resultant nanocomposite. For example, the weight ratio of the polymeric resin to the block copolymer may be in a range of 20 to 200, inclusive.

Any organic polymeric resin may be used in practice of the present invention. For example, useful polymeric resins may be thermoplastic, thermosetting, or a combination thereof. Typically, methods according to the present invention are well suited for use with thermoplastic polymeric resins.

Useful thermoplastic polymeric resins include, for example: polylactones such as, for example, poly(pivalolactone) and poly(caprolactone); polyurethanes such as, for example, those derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, or 4,4'-diisocyanatodiphenylmethane with linear long-chain diols such as poly(tetramethylene adipate), poly(ethylene adipate), poly(1,4-butylene adipate), poly(ethylene succinate), poly(2,3-butylenesuccinate), polyether diols and the like; polycarbonates such as poly(methane bis(4-phenyl)carbonate), poly(1,1-ether bis(4-phenyl)carbonate), poly(diphenylmethane bis(4-phenyl)carbonate), poly(1,1-cyclohexane bis(4-phenyl)carbonate), or poly(2,2-(bis4-hydroxyphenyl)propane) carbonate; polysulfones; polyether ether ketones; polyamides such as, for example, poly(4-aminobutyric acid), poly(hexamethylene adipamide), poly(6-aminohexanoic acid), poly(m-xylylene adipamide), poly(p-xylylene sebacamide), poly(metaphenylene isophthalamide), and poly(p-phenylene terephthalamide); polyesters such as, for example, poly(ethylene azelate), poly(ethylene-1,5-naphthalate), poly(ethylene-2,6-naphthalate), poly(1,4-cyclohexane dimethylene terephthalate), poly(ethylene oxybenzoate), poly(para-hydroxy benzoate), poly(1,4-cyclohexylidene dimethylene terephthalate) (cis), poly(1,4-cyclohexylidene dimethylene terephthalate) (trans), polyethylene terephthalate, and polybutylene terephthalate; poly(arylene oxides) such as, for example, poly(2,6-dimethyl-1,4-phenylene oxide) and poly(2,6-diphenyl-1,1phenylene oxide); poly(arylene sulfides) such as, for example, polyphenylene sulfide; polyetherimides; vinyl polymers and their copolymers such as, for example, polyvinyl acetate, polyvinyl alcohol, polyvinyl chloride, polyvinyl butyral, polyvinylidene chloride, and ethylene-vinyl acetate copolymers; acrylic polymers such as for example, poly(ethyl acrylate), poly(n-butyl acrylate), poly(methyl methacrylate), poly(ethyl methacrylate), poly(n-butyl methacrylate), poly(n-propyl methacrylate), polyacrylamide, polyacrylonitrile, polyacrylic acid, ethylene-ethyl acrylate copolymers, ethylene-acrylic acid copolymers; acrylonitrile copolymers (e.g., poly(acrylonitrile-co-butadiene-co-styrene) and poly(styrene-co-acrylonitrile)); styrenic polymers such as, for example, polystyrene, poly(styrene-co-maleic anhydride) polymers and their derivatives, methyl methacrylate-styrene copolymers, and methacrylated butadiene-styrene copolymers; polyolefins such as, for example, polyethylene, polybutylene, polypropylene, chlorinated low density polyethylene, poly(4-methyl-1-pentene); ionomers; poly(epichlorohydrins); polysulfones such as, for example, the reaction product of the sodium salt of 2,2-bis(4-hydroxyphenyl) propane and 4,4'-dichlorodiphenyl sulfone; furan resins such as, for example, poly(furan); cellulose ester plastics such as, for example, cellulose acetate, cellulose acetate butyrate, and cellulose propionate; protein plastics; polyarylene ethers such as, for example, polyphenylene oxide; polyimides; polyvinylidene halides; polycarbonates; aromatic polyketones; polyacetals; polysulfonates; polyester ionomers; and polyolefin ionomers. Copolymers and/or combinations of these aforementioned polymers can also be used.

Useful elastomeric polymeric resins (i.e., elastomers) include thermoplastic and thermoset elastomeric polymeric resins, for example, polybutadiene, polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, silicone elastomers, poly(butadiene-co-nitrile), hydrogenated nitrile-butadiene copolymers, acrylic elastomers, ethylene-acrylate copolymers.

Useful thermoplastic elastomeric polymer resins include block copolymers, made up of blocks of glassy or crystalline blocks such as polystyrene, poly(vinyltoluene), poly(t-butylstyrene), and polyester, and the elastomeric blocks such as polybutadiene, polyisoprene, ethylene-propylene copolymers, ethylene-butylene copolymers, polyether ester and the like as, for example, poly(styrene-butadiene-styrene) block copolymers marketed by Shell Chemical Company, Houston, Tex., under the trade designation "KRATON". Copolymers and/or mixtures of these aforementioned elastomeric polymeric resins can also be used Useful polymeric resins also include fluoropolymers, that is, at least partially fluorinated polymers. Useful fluoropolymers include, for example, those that are preparable (e.g., by free-radical polymerization) from monomers comprising chlorotrifluoroethylene, 2-chloropentafluoropropene, 3-chloropentafluoropropene, vinylidene fluoride, trifluoroethylene, tetrafluoroethylene, 1-hydropentafluoropropene, 2-hydropentafluoropropene, 1,1-dichlorofluoroethylene, dichlorodifluoroethylene, hexafluoropropylene, vinyl fluoride, a perfluorinated vinyl ether (e.g., a perfluoro(alkoxy vinyl ether) such as $CF_3OCF_2CF_2CF_2OCF=CF_2$, or a perfluoro(alkyl vinyl ether) such as perfluoro(methyl vinyl ether) or perfluoro(propyl vinyl ether)), cure site monomers such as for example nitrile containing monomers (e.g., $CF_2=CFO(CF_2)_LCN$, $CF_2=CFO[CF_2CF(CF_3)O]_q(CF_2O)_y$ $CF(CF_3)CN$, $CF_2=CF[OCF_2CF(CF_3)]_rO(CF_2)_tCN$, or $CF_2=CFO(CF_2)_uOCF(CF_3)CN$ where L=2-12; q=0-4; r=1-2; y=0-6; t=1-4; and u=2-6), bromine containing monomers (e.g., $Z-R_f-O_x-CF=CF_2$, wherein Z is Br or I, $R_f$ is a substituted or unsubstituted $C_1$-$C_{12}$ fluoroalkylene, which may be perfluorinated and may contain one or more ether oxygen atoms, and x is 0 or 1); or a combination thereof, optionally in combination with additional non-fluorinated monomers such as, for example, ethylene or propylene. Specific examples of such fluoropolymers include polyvinylidene fluoride; copolymers of tetrafluoroethylene, hexafluoropropylene and vinylidene fluoride; copolymers of tetrafluoroethylene, hexafluoropropylene, perfluoropropyl vinyl ether, and vinylidene fluoride; tetrafluoroethylene-hexafluoropropylene copolymers; tetrafluoroethylene-perfluoro(alkyl vinyl ether) copolymers (e.g., tetrafluoroethylene-perfluoro(propyl vinyl ether)); and combinations thereof.

Useful commercially available thermoplastic fluoropolymers include, for example, those marketed by Dyneon LLC, Oakdale, Minn., under the trade designations "THV" (e.g., "THV 220", "THV 400G", "THV 500G", "THV 815", and "THV 610X"), "PVDF", "PFA", "HTE", "ETFE", and "FEP"; those marketed by Atofina Chemicals, Philadelphia, Pa., under the trade designation "KYNAR" (e.g., "KYNAR 740"); those marketed by Solvay Solexis, Thorofare, N.J., under the trade designations "HYLAR" (e.g., "HYLAR 700") and "HALAR ECTFE".

Useful thermosetting polymeric resins include, for example, epoxy resins, alkyd resins, acrylic resins, one-part and two-part urethane resins, cyanate resins, phenolic resins, aminoplast resins, and combinations thereof. If a thermosetting resin is used, a suitable curative for that resin (e.g., a thermal curative and/or photocurative) may also be included with the polymeric resin.

Optionally, the first and/or second mixtures and/or nanocomposite may further contain one or more additives such as, for example, surfactants, flame proofing agents, fillers, ultraviolet absorbers, antioxidants, tackifier resins, colorants, fragrances, or antimicrobial agents.

Methods according to the present invention may be carried out in batch process or in a continuous manner.

Nanocomposites prepared according to the present invention are dispersions, typically an isotropic dispersion of exfoliated silicate platelets in the polymeric resin. The amount of exfoliated silicate platelets in the nanocomposite may be in any amount, but are typically in a range of from 0.1 to 10 percent by weight, more typically in a range of from 0.5 to 7 percent by weight, and even more typically in a range of from 1 to 5 percent by weight, inclusive, based on the total weight of the nanocomposite. Similarly, in some embodiments, the weight ratio of the exfoliated silicate platelets to the second layered silicate in the nanocomposite may be at least 1, 2, 3, 4, 5, 10, 50 or more, although lesser weight ratios may also be used.

While nanocomposites according to the present invention are typically prepared and processed in a fluid state (e.g., as a melt or in optional solvent), they may also be utilized as solids; for example after cooling and/or after removing any optional solvent.

The polymeric resin in the nanocomposite may be hardened, for example, by cooling in the case of thermoplastic resins, or by at least partially curing in the case of thermosetting polymeric resins.

Compositions prepared according to the present invention are useful, for example, in the manufacture of barrier films or bottles, and flame retardant materials.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used throughout the Examples:

Abbreviation Description
An AB diblock copolymer, poly(t-butyl methacrylate-block-2-(N-methylperfluorobutanesulfonamido)ethyl methacrylate).
P(t-BMA-MeFBSEMA) Synthesized using a stirred tubular reactor process generally as described in Example 4 of U.S. Pat. Appl. Publ. 2004/0023016 (Cernohous et al.); $M_n$=65 kg/mole, PDI=1.7, 80/20 t-butyl methacrylate/MeFBSEMA by weight.
Oc1 Organically modified montmorillonite clay available under the trade designation "CLOISITE 30B" from Southern Clay Products (modified with methyl, tallow (~65% $C_{18}$; ~30% $C_{16}$; ~5% $C_{14}$), bis-2-hydroxyethyl, quaternary ammonium chloride); believed to have a d-layer spacing of 1.85 nm.
PP Polypropylene available under the trade designation "ESCORENE 1024" from ExxonMobil Corp., Houston, Tex.
FE Fluoroelastomer available under the trade designation "FE5640 Q" from Dyneon, LLC, Oakdale, Minn.; a 65.9 percent by weight fluorine copolymer of vinylidene fluoride and hexafluoropropylene.

The following procedures were used in the examples:

Film Preparation for XRD and TEM Analysis

Analysis via XRD and TEM was done on 1 mm thick films. To form the films, each material to be analyzed was placed between 0.051 mm thick untreated polyester liners, which in turn were placed between 2 aluminum plates (3.2 mm thick each) to form a stack. Two shims (1 mm thick each) were placed to either side of the stack such that upon pressing the assembled stack the mixture would not come into contact with either shim. Each stack was placed in a heated hydraulic press available under the trade designation "WABASH MPI MODEL G30H-15-LP" from Wabash MPI, Wabash, Ind. Both the top and bottom press plates were heated at 193° C. The stack was pressed for 1 minute at 1500 psi (10 MPa). The hot stack was then moved to a low-pressure water-cooled press for 30 seconds to cool the stack. The stack was disassembled and the liners were removed from both sides of the film disc that resulted from pressing the mixture.

X-Ray Diffraction (XRD)

Reflection geometry X-ray scattering data were collected using a four-circle diffractometer (available under the trade designation "HUBER (424/511.1)" from Huber Diffraktionstechnik GmbH, D83253 Rimsting, Germany), copper K-alpha radiation, and scintillation detector registry of the scattered radiation. The incident beam was collimated to a circular aperture of 0.70 mm. Scans were conducted in a reflection geometry from 0.5 to 10 degrees (2 theta) using a 0.05 degree step size and 10 second dwell time. A sealed tube X-ray source and X-ray generator settings of 40 kV and 20 mA were used. Data analysis and peak position definition were determined using X-ray diffraction analysis software available under the trade designation "JADE" from MDI, Inc., Livermore, Calif.

Transmission Electron Microscopy (TEM)

TEM was performed using a transmission electron microscope operated at 200 kV, available under the trade designation "JEOL 200CX" from JEOL USA, Peabody, Mass.

Molecular Weight and Polydispersity

Average molecular weight and polydispersity were determined by Gel Permeation Chromatography (GPC) analysis. Approximately 25 mg of a sample were dissolved in 10 milliliters (mL) of THF to form a mixture. The mixture was filtered using a 0.2-micron pore size polytetrafluoroethylene syringe filter. Then, about 150 microliters of the filtered solution were injected into a gel-packed column 25 cm long by 1 cm diameter available under the trade designation "PLGEL-MIXED B" from PolymerLabs, Amherst, Mass., that was part of a GPC system equipped with an autosampler and a pump. The GPC was system operated at room temperature using THF eluent that moved at a flow rate of approximately 0.95 mL/minute. A refractive index detector was used to detect changes in concentration. Number average molecular weight ($M_n$) and polydispersity index (PDI) calculations were calibrated using narrow polydispersity polystyrene controls ranging in molecular weight from 600 to $6 \times 10^6$ g/mole. The actual calculations were made with software (available under the trade designation "CALIBER" from Polymer Labs, Amherst, Mass.).

$^1$H NMR Spectroscopy

The relative concentration of each block was determined by $^1$H Nuclear Magnetic Resonance ($^1$H NMR) spectroscopy analysis. Specimens were dissolved in deuterated chloroform at a concentration of about 10 percent by weight and placed in a 500 MHz NMR Spectrometer available under the trade designation "UNITY 500 MHZ NMR SPECTROMETER" from Varian, Inc., Palo Alto, Calif. Block concentrations were calculated from relative areas of characteristic block component spectra.

The following general procedures are used in the examples:

General Batch Procedure for Making a Composite

Batch composite formation was performed in a melt mixer available under the trade designation "BRABENDER PLASTI-CORDER MODEL PL2100" (BPM) from Brabender, South Hackensack, N.J. The mixer was equipped with a type 6 mixer head utilizing roller blade mixing paddles. Batch temperature and torque were measured during the mixing.

Continuous Twin Screw Extrusion

Continuous twin-screw extrusion is carried out using a co-rotating 25-mm twin-screw extruder (TSE) with 41:1 L/D, available under the trade designation "COPERION ZSK-25 WORLD LAB EXTRUDER" from Coperion, Ramsey, N.J. Barrel zones for this extruder are 4D in length (100 mm). All examples are done using a 165 rpm screw speed.

In order to create a uniform melt stream prior to the addition of the block copolymer and clay materials in barrel zones 2 and 3 the screw design incorporates a distributive mixing section of 1.76D (i.e., 1.76 times the bore diameter) total length, consisting mainly of gear-type mixing elements, under the trade designation "ZME" by Coperion. A low to medium shear intensity kneading section is utilized in barrel zone 4 for incorporating and melting the hand-blended block copolymer and clay powder additives into the molten resin after their addition to the extruder in barrel zone 3 through a 2D port open to the atmosphere. Total length for this kneading section is 2.5D. The temperature of the melt stream is monitored and recorded over this kneading section by an immersion-depth thermocouple. A small atmospheric vent, 1D in length, at the beginning of barrel zone 5 allows the venting of any entrapped air from the powder addition. Spanning barrel zone 5, 6, and 7, a 5.5D kneading section with shear-intensive forward kneading blocks is designed for dispersion and exfoliation of the clay into the host resin. This mixing section is sealed on the downstream end by three, narrow-paddled, reverse kneading blocks to ensure that the mixing section is filled with melt as well as to distribute the exfoliated clay material throughout the composite. The melt temperature of the material in this kneading section is monitored and recorded using an immersion-depth thermocouple. Another 5D mixing section with shear-intensive, forward kneading blocks is used in zones 8 and 9 to provide additional shear for further exfoliation of the clay particles. This section is not sealed with reverse kneading blocks in order to allow a nitrogen sweep gas, which is injected in barrel zone 7, to flow freely across the mostly-filled mixing zone to the vacuum vent, 2D in length, in barrel zone 9 to remove any volatiles. A vacuum of 52 torr (6.9 kPa) is pulled on this vent.

The continuous extrusion of molten resin into the feed zone of the ZSK-25 is accomplished by a 1.25 inch (3.18 cm) single screw extruder (SSE) (available under the trade designation "KILLION KTS-125 SINGLE-SCREW EXTRUDER" from Davis-Standard; Pawcatuck, Conn.), equipped with a 3.0:1 compression general-purpose screw with 24 flights. Powder additives are hand-blended and fed into barrel zone 3 of the twin-screw extruder using a gravimetric feeder equipped with twin auger screws, available under the trade designation "K-TRON GRAVIMETRIC FEEDER, MODEL KCLKT20" from K-Tron International, Pitman, N.J. The molten composite is metered through a 10.3 mL/revolution gear pump available under the trade designation "NORMAG" from Dynisco Extrusion, Hickory, N.C., and extruded through a ½-inch (1.3-cm) diameter pipe to form a strand. The strand is cooled at 8° C. in a water bath and pelletized.

General Procedure for Milling

A variable speed two-roll mill obtained from Kobelco Stewart Bolling, Hudson, Ohio, is used to compound a master batch of clay and block polymer into FE. The rollers are 6 inches (15 cm) in diameter and 12 inches (30 cm) long. The masterbatch is added after the FE is banded on the roll and mixed by cutting the band and pulling the rolling bank through the nip until the composite is uniform in appearance (approximately 10 minutes). The roll speed is 31 rpm.

EXAMPLE 1

According to the General Batch Procedure for Making a Composite, polypropylene (45 g) was added to the BPM, which was set at 180° C. and 50 rpm. Once the polypropylene had melted, it was mixed for an additional 5 minutes until the batch had maintained a constant temperature. P(t-BMA-MeFBSEMA) (2.5 g) and 2.5 g of OC1 were added to the polypropylene melt. The temperature and torque were allowed to equilibrate once more and the composite was mixed for an additional 30 minutes. An aliquot portion of the resultant mixture was pressed into a film and analyzed via XRD and TEM. TEM analysis indicated that the OCIB had been intercalated.

EXAMPLES 2A–2C

According to the General Procedure for Continuous Twin-Screw Extrusion, PP was fed as a melt into the first zone of the extruder, and P(t-BMA-MeFBSEMA) and OCI were dry blended and fed into zone 3 of the extruder. The feed rates and compositions of the resultant composites are reported in Table 1 (below).

TABLE 1

| Example | PP Feed Rate, kg/hr | P(t-BMA-MeFBSEMA) Feed rate, kg/hr | OC1 Feed Rate, kg/hr | Composite Composition, Weight Ratio of PP/30B/P(t-BMA-MeFBSEMA) |
|---|---|---|---|---|
| 2A | 8.17 | 0.45 | 0.45 | 90/5/5 |
| 2B | 8.35 | 0.27 | 0.45 | 92/5/3 |
| 2C | 8.53 | 0.09 | 0.45 | 94/5/1 |

Aliquot portions of the extruded composites were pressed and analyzed via XRD. XRD and TEM analysis determined that a majority of the OCI in the composites of Examples 2A, 2B, and 2C was intercalated.

EXAMPLES 3A–3B

Masterbatches of P(t-BMA-MeFBSEMA) and OC1 were mixed at 50 rpm and 180° C. according to the General Batch Procedure for Making a Composite. The compositions of the masterbatches are reported in Table 2 (below).

TABLE 2

| Example | P(t-BMA-MeFBSEMA), g | OC1, g | Masterbatch | Masterbatch Composition, Weight Ratio of 30B/P(t-BMA-MeFBSEMA) | Major Clay Form |
|---|---|---|---|---|---|
| 3A | 120 | 120 | 3A | 50/50 | Intercalated, d-layer spacing increased |
| 3B | 20 | 180 | 3B | 90/10 | Intercalated, d-layer spacing increased |

EXAMPLES 4A–4D

Mixtures of FE, OC1, and P(t-BMA-MeFBSEMA) were made on an open roll mill according to the General Procedure for Milling, and using amounts reported in Table 3. After milling, the aliquot portions of the resultant compositions were pressed and analyzed via XRD. The results are reported in Table 3 (below).

TABLE 3

| Example | FE, g | OC1, g | Masterbatch 3A, g | Masterbatch 3B, g | Composition weight ratio of FE/OC1/ P(t-BMA-MeFBSEMA) | Major Clay Form |
|---|---|---|---|---|---|---|
| 4A | 300 | 30 | | | 90.9/9.1/0 | intercalated, d-layer spacing increased |
| 4B | 300 | | 60 | | 83/8.5/8.5 | majority of clay was exfoliated by TEM |
| 4C | 300 | 30 | | | 91/4.5/4.5 | majority of clay was exfoliated by TEM |
| 4D | 300 | | | 30 | 90.9/8.2/0.9 | majority of clay was exfoliated by TEM |

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of making a composition, the method comprising:
   combining components comprising:
   a first layered silicate having a first d-layer spacing, and a block copolymer having:
      at least one block is compatible with the first layered silicate, and
      at least one highly fluorinated block that is prepared from a fluorinated acrylate monomer described by the formula:

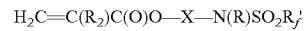

$H_2C=C(R_2)C(O)O-X-N(R)SO_2R_f'$ wherein:
   $R_f'$ is $-C_6F_{13}$, $-C_4F_9$, or $-C_3F_7$;
   R is hydrogen, $C_1$ to $C_{10}$ alkyl, or $C_6$-$C_{10}$ aryl; and
   X is a divalent connecting group;

applying at least sufficient thermal energy and at a sufficient shear rate to provide a mixture comprising the block copolymer having dispersed therein at least one of:
   a) a second layered silicate having a second d-layer spacing that is greater than the first d-layer spacing; or
   b) exfoliated silicate platelets.

2. A method according to claim 1, wherein the components further comprise solvent.

3. A method according to claim 1, wherein the total amount of the second layered silicate and exfoliated silicate platelets comprises at least 30 percent by weight of the mixture.

4. A method according to claim 1, wherein the total amount of the second layered silicate and exfoliated silicate platelets comprises at least 40 percent by weight of the mixture.

5. A method according to claim 1, wherein the total amount of second layered silicate and exfoliated silicate platelets comprises at least 50 percent by weight of the mixture.

6. A method according to claim 1, wherein the total amount of second layered silicate and exfoliated silicate platelets comprises at least 60 percent by weight of the mixture.

7. A method according to claim 1, wherein the block copolymer comprises a diblock copolymer.

8. A method according to claim 1, wherein the fluorinated acrylate comprises

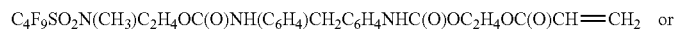

$C_4F_9SO_2N(CH_3)C_2H_4OC(O)NH(C_6H_4)CH_2C_6H_4NHC(O)OC_2H_4OC(O)CH{=}CH_2$ or

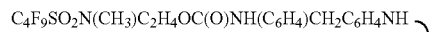

$C_4F_9SO_2N(CH_3)C_2H_4OC(O)NH(C_6H_4)CH_2C_6H_4NH-C(O)OC_2H_4OC(O)C(CH_3){=}CH_2$.

9. A method according to claim 1, wherein the layered silicate comprises montmorillonite, nontronite, bentonite, beidellite, hectorite, saponite, sauconite, fluorohectorite, stevensite, volkonskoite, magadiite, kenyaite, halloysite, hydrotalcite, a synthetic layered silicate, or a combination thereof.

10. A method according to claim 1, wherein the layered silicate comprises an organoclay.

11. A method according to claim 1, further comprising combining the mixture with a polymeric resin to provide a nanocomposite, wherein the nanocomposite comprises a exfoliated silicate platelets dispersed in the polymeric resin.

12. A method according to claim 11, wherein the polymeric resin comprises a thermoplastic resin.

13. A method according to claim 11, wherein the polymeric resin comprises a thermosetting resin.

14. A method according to claim 11, wherein the polymeric resin comprises at least one fluoropolymer selected from the group consisting of polyvinylidene fluoride; copolymers of tetrafluoroethylene, hexafluoropropylene and vinylidene fluoride; copolymers of tetrafluoroethylene, hexafluoropropylene, perfluoropropyl vinyl ether, and vinylidene fluoride; tetrafluoroethylene-hexafluoropropylene copolymers; tetrafluoroethylene-perfluoro(alkyl vinyl ether) copolymers; and combinations thereof.

15. A method according to claim 11, wherein the weight ratio of the polymeric resin to the block copolymer is in a range of 20 to 200, inclusive.

16. A method according to claim 11, wherein the exfoliated silicate platelets are contained in the nanocomposite in an amount of from 1 to 5 percent by weight based on the total weight of the composition.

17. A composition comprising a block copolymer and at least one of an intercalated layered silicate or exfoliated silicate platelets, wherein the intercalated layered silicate comprises the block copolymer intercalated into the layered silicate, wherein at least one block of the block copolymer is compatible with the first layered silicate, and wherein the block copolymer comprises at least one highly fluorinated block that is prepared from a fluorinated acrylate monomer described by the formula:

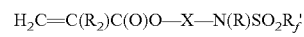

$H_2C{=}C(R_2)C(O)O-X-N(R)SO_2R_f'$ wherein:
$R_f'$ is $-C_6F_{13}$, $-C_4F_9$, or $-C_3F_7$;
R is hydrogen, $C_1$ to $C_{10}$ alkyl, or $C_6$-$C_{10}$ aryl; and
X is a divalent connecting group.

18. A composition according to claim 17, wherein the block copolymer comprises a diblock copolymer.

19. A composition according to claim 17, wherein the fluorinated acrylate comprises

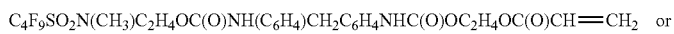

$C_4F_9SO_2N(CH_3)C_2H_4OC(O)NH(C_6H_4)CH_2C_6H_4NHC(O)OC_2H_4OC(O)CH{=}CH_2$ or

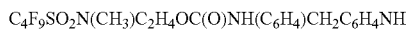

$C_4F_9SO_2N(CH_3)C_2H_4OC(O)NH(C_6H_4)CH_2C_6H_4NH-C(O)OC_2H_4OC(O)C(CH_3){=}CH_2$.

20. A composition according to claim 17, further comprising at least one polymeric resin.

21. A composition according to claim 20, wherein said at least one polymeric resin comprises a thermoplastic resin.

22. A composition according to claim 20, wherein said at least one polymeric resin comprises a crosslinked resin.

23. A composition according to claim 20, wherein said at least one polymeric resin comprises at least one fluoropolymer selected from the group consisting of polyvinylidene fluoride; copolymers of tetrafluoroethylene, hexafluoropropylene and vinylidene fluoride; copolymers of tetrafluoroethylene, hexafluoropropylene, perfluoropropyl vinyl ether, and vinylidene fluoride; tetrafluoroethylene-hexafluoropropylene copolymers; tetrafluoroethylene-perfluoro(alkyl vinyl ether) copolymers; and combinations thereof.

24. A composition according to claim 20, wherein the weight ratio of said at least one polymeric resin to the block copolymer is in a range of 20 to 200, inclusive.

25. A composition according to claim 20, wherein the exfoliated silicate platelets are contained in the composition in an amount of from 1 to 5 percent by weight based on the total weight of the composition.

26. A composition according to claim 20, wherein the composition comprises at least a portion of a film or bottle.

* * * * *